United States Patent
Diab et al.

(10) Patent No.: US 9,917,725 B2
(45) Date of Patent: *Mar. 13, 2018

(54) AUTOMOTIVE NEURAL NETWORK

(71) Applicant: Broadcom Corporation, Irvine, CA (US)

(72) Inventors: Wael William Diab, San Francisco, CA (US); Mehmet V. Tazebay, Irvine, CA (US)

(73) Assignee: AVAGO TECHNOLOGIES GENERAL IP (SINGAPORE) PTE. LTD, Singapore (SG)

( * ) Notice: Subject to any disclaimer, the term of this patent is extended or adjusted under 35 U.S.C. 154(b) by 83 days.

This patent is subject to a terminal disclaimer.

(21) Appl. No.: 14/871,116

(22) Filed: Sep. 30, 2015

(65) Prior Publication Data

US 2016/0020943 A1    Jan. 21, 2016

Related U.S. Application Data

(63) Continuation of application No. 14/586,570, filed on Dec. 30, 2014, now Pat. No. 9,686,126, which is a continuation of application No. 13/623,252, filed on Sep. 20, 2012, now Pat. No. 8,953,436.

(51) Int. Cl.
| | |
|---|---|
| *H04L 12/24* | (2006.01) |
| *G06F 11/14* | (2006.01) |
| *H04L 29/08* | (2006.01) |
| *H04L 29/14* | (2006.01) |
| *G06F 1/32* | (2006.01) |
| *G06F 11/20* | (2006.01) |

(52) U.S. Cl.
CPC ........ *H04L 41/0668* (2013.01); *G06F 1/3287* (2013.01); *G06F 11/1423* (2013.01); *G06F 11/1476* (2013.01); *G06F 11/2033* (2013.01); *H04L 67/12* (2013.01); *H04L 67/327* (2013.01); *H04L 69/40* (2013.01); *G06F 11/2035* (2013.01); *G06F 11/2038* (2013.01); *G06F 2201/805* (2013.01); *G06F 2201/85* (2013.01)

(58) Field of Classification Search
None
See application file for complete search history.

(56) References Cited

U.S. PATENT DOCUMENTS

| | | | | |
|---|---|---|---|---|
| 5,957,985 | A * | 9/1999 | Wong .................. | G06F 11/2028 701/29.2 |
| 2009/0010153 | A1* | 1/2009 | Filsfils .................... | H04L 45/02 370/218 |
| 2012/0020206 | A1* | 1/2012 | Busi ........................ | H04L 41/00 370/217 |
| 2012/0210160 | A1* | 8/2012 | Fuhrman ............ | G05B 19/0428 714/4.12 |

* cited by examiner

*Primary Examiner* — Anh Ngoc Nguyen

(74) *Attorney, Agent, or Firm* — Garlick & Markison; Harry S. Tyson, Jr.

(57) ABSTRACT

Network node modules within a vehicle are arranged to form a reconfigurable automotive neural network. Each network node module includes one or more subsystems for performing one or more operations and a local processing module for communicating with the one or more subsystems. A management system enables traffic from the one or more subsystems of a particular network node module to be re-routed to an external processing module upon failure of the local processing module of that particular network node module.

36 Claims, 11 Drawing Sheets

AUTOMOTIVE NEURAL NETWORK

CROSS REFERENCE TO RELATED APPLICATIONS

The present U.S. Utility Patent Application claims priority pursuant to 35 U.S.C. § 120 as a continuation of U.S. Utility application Ser. No. 14/586,570, entitled "Automotive Neural Network", filed Dec. 30, 2014, which is a continuation of U.S. Utility application Ser. No. 13/623,252, entitled "Automotive Neural Network", filed Sep. 20, 2012, issued as U.S. Pat. No. 8,953,436 on Feb. 10, 2015, all of which are hereby incorporated herein by reference in their entirety and made part of the present U.S. Utility Patent Application for all purposes.

BACKGROUND OF THE INVENTION

Field of the Invention

This invention relates generally to communication and more particularly to communication within a vehicle.

Description of Related Art

As is known, a vehicle (e.g., automobile, truck, bus, an agricultural vehicle, ship, and/or aircraft) includes a vehicle communication network. The complexity of the vehicle communication network varies depending on the amount of electronic devices within the vehicle. For example, many more advanced vehicles include electronic modules for engine control, transmission control, antilock braking, body control, emissions control, etc. To support the various electronic devices within the vehicle, the automotive industry has generated numerous communication protocols.

FIG. 1 is a schematic block diagram of a prior art vehicular communication network that illustrates the various bus protocols and the electronic devices that utilize such protocols. The bus protocols include: (1) J1850 and/or OBDII, which are typically used for vehicle diagnostic electronic components; (2) Intellibus, which is typically used for electronic engine control, transmission control other vehicle systems such as climate control, and it may also be used for drive-by-wire electronic control units (ECU); (3) high-speed controller area network (CAN), which is typically used for braking systems and engine management systems; (4) distributed system interface (DSI) and/or Bosch—Siemens—Temic (BST), which is typically used for safety related electronic devices; (5) byteflight, which is typically used for safety critical electronic device applications; (6) local interconnect network (LIN), which is typically used for intelligent actuators and/or intelligent sensors; (7) low-speed controller area network (CAN) and/or Motorola® interconnect (MI), which are typically used for low-speed electronic devices such as Windows, mirrors, seats and/or climate control; (8) mobile media link (MML), domestic digital data (D2B), smartwireX, inter-equipment bus (IEBus), and/or media oriented systems transport (MOST), which are typically used to support multimedia electronic devices within a vehicle such as an audio head unit and amplifiers, CD player, a DVD player, a cellular connection, a Bluetooth connection, peripheral computer connections, rear seat entertainment (RSE) units, a radio, digital storage, and/or a GPS navigation system; (9) Low-Voltage Differential Signaling (LVDS), which are typically used to support, heads up display, instrument panel displays, other digital displays, driver assist digital video cameras, and (10) FlexRay, which may be used for safety critical features and/or by-wire applications.

To enable electronic components using different bus protocols to communicate with each other, one or more bus gateways may be included in the vehicle network. For example, in a safety related issue, a safety ECU may need to communicate with a braking ECU, and engine control ECU, and/or a transmission control ECU. In this example, the bus gateway performs some degree of protocol conversion to facilitate the communication between the ECUs of differing communication protocols.

In addition to providing multiple vehicle network protocols to support a variety of electronic devices within a vehicle, most vehicle manufacturers are striving for improved fuel efficiency. In this regard, a reduction in weight of 400 pounds is approximately equivalent to reducing continuous power consumption by 100 Watts. As such, by removing weight from a vehicle, fuel efficiency may be improved. As is known, a typical vehicle includes 400 to 600 pounds of wiring, which is the second heaviest component in a vehicle; the engine is the heaviest.

DETAILED DESCRIPTION OF THE INVENTION

Figure 1:
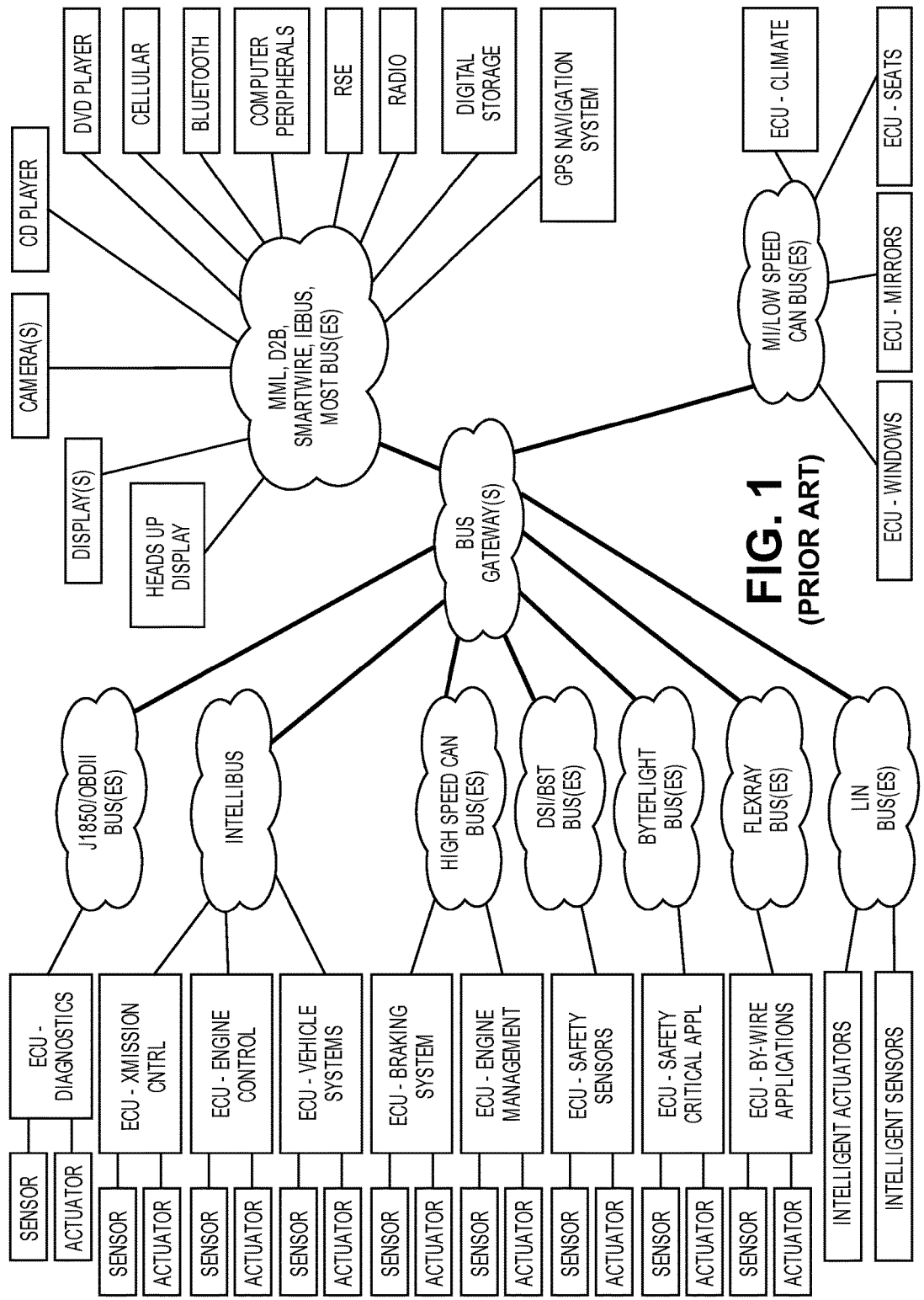
FIG. 1 is a schematic block diagram of a prior art vehicular communication network.
Figure 2:
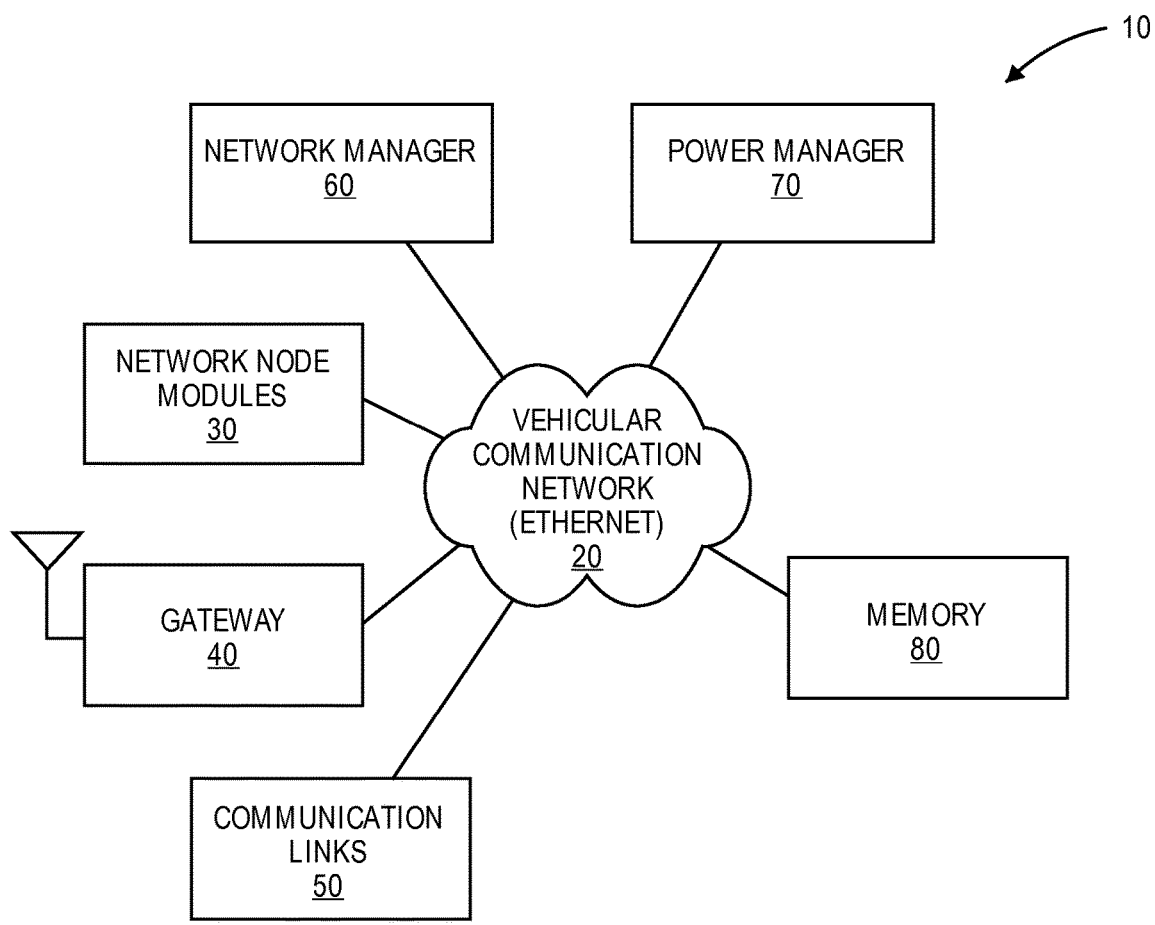
FIG. 2 is a schematic block diagram of an embodiment of an automotive neural network in accordance with the present invention.

FIG. 2 is a schematic block diagram of an embodiment of an automotive neural network 10 that includes a vehicular communication network 20 (e.g., Ethernet-based), a plurality of network node modules 40, a gateway 40, one or more communication links 50, a network manager 60, a power manager 70 and a memory 80. The communication links 50 may include wired and/or wireless interfaces to support connectivity with cellular devices, Bluetooth devices, infrared devices, and/or computer peripheral devices. For example, a Bluetooth transceiver may be coupled to the vehicular communication network 20 to support Bluetooth communications with a portable audio/video unit, with a headset, etc.

Figure 7:
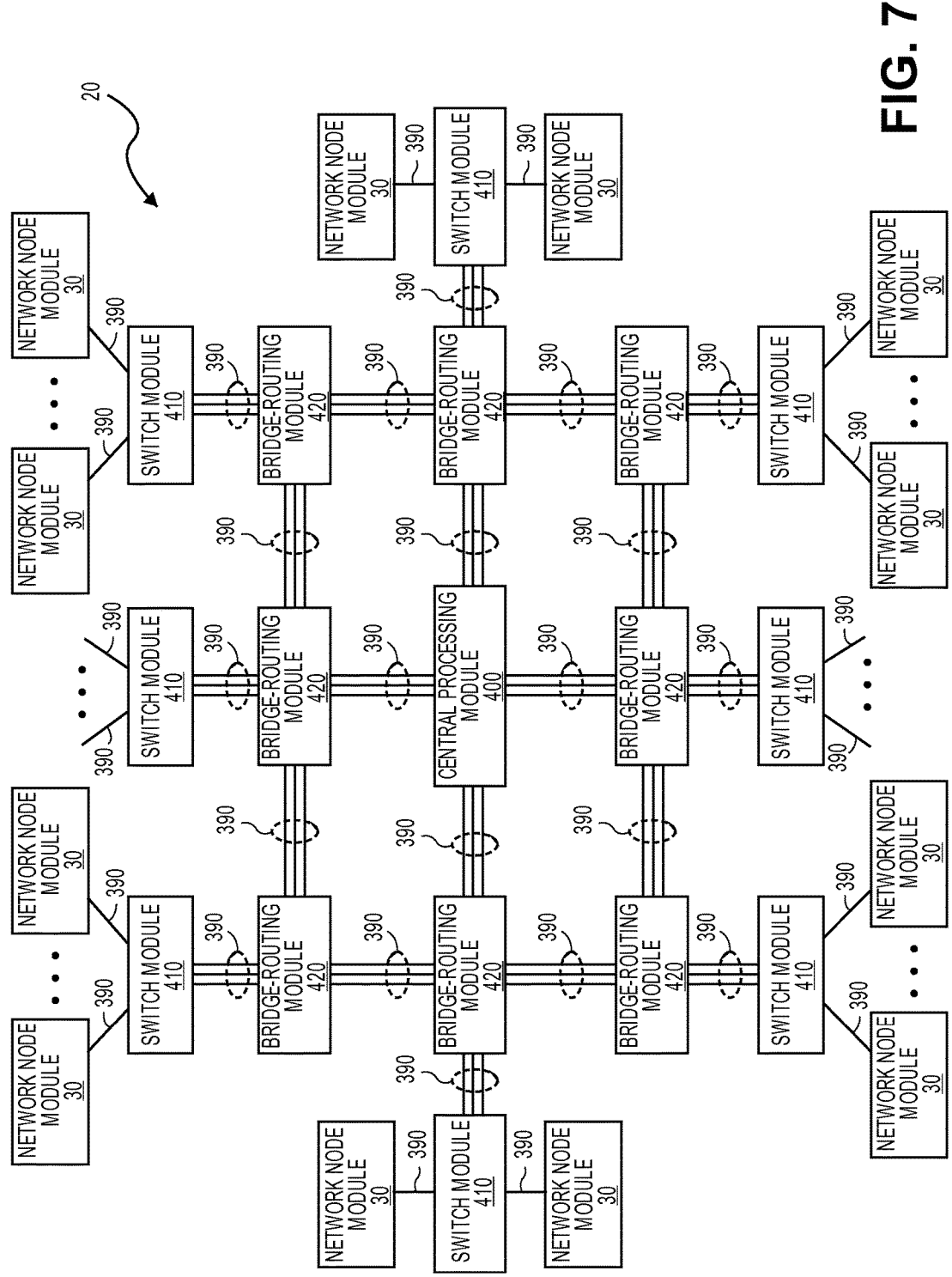
FIG. 7 is a schematic block diagram of another exemplary embodiment of an automotive neural network in accordance with the present invention.

The vehicular communication network 20 includes a plurality of bridge-routing modules and a plurality of switch modules (examples of which are shown in FIG. 7). Within the vehicular communication network 20, a bridge-routing module is redundantly coupled to one or more adjacent bridge-routing modules and a switch module is redundantly coupled to one or more bridge-routing modules. The vehicular communication network 20 may be divided into sub-networks that are coupled together via a data bridge. As an example, the vehicular communication network 20 may include a data bridge, a first sub-network operably coupled to first sub-set of the network node modules 30, and a second sub-network operably coupled to second sub-set of the network node modules 30. The data bridge facilitates (e.g., initiates, issues an instruction, performs, etc.) communication of a sub-set of the packets between the first and second sub-networks.

The gateway 40 may include one or more wireless transceivers to support communication with one or more external networks, such as a cellular network or home network, and/or to support diagnostic ports for communication with automobile service providers, automobile manufacturers, etc. Such a wireless transceiver includes a network interface, which enables it to connect to the vehicular communication network 20.

The network node modules 30 may each include, for example, a network interface, a processing module, and at least one device. If the device is an analog device, the network node module 30 further includes an analog to digital converter and/or a digital to analog converter. Such devices may include a sensor, an actuator, an intelligent sensor, an intelligent actuator, an electronic control unit (ECU), and/or a control device. As another example, a network node module 30 may include a vehicle assembly, such as a switching circuit module, a plurality of network interfaces operably coupled to the switching circuit module, one or more processing modules operably coupled to the switching circuit module and a plurality of devices operably coupled to the one or more processing modules. Various examples of network node modules 30 will be discussed in greater detail with reference to FIGS. 3-10.

The network manager 60 performs a variety of functions to coordinate packet communication within the vehicle communication network and to facilitate network resource management. For example, the network manager 60 may coordinate communication of packets, via the vehicular communication network 20, among the network node modules 30, the memory 80, and the gateway 40 based on individual content of the packets and in accordance with a global vehicle network communication protocol. The global vehicle network communication protocol includes information regarding, for example, formatting of the packets, packet transmission prioritization schemes (e.g., mission critical packets having a higher priority, infotainment (information and/or entertainment) packets having a lower priority, etc.), network management processing (e.g., vehicular communication network resources and devices coupled to the vehicular communication network), and vehicle network operation parameters (e.g., network configuration management).

As another example, the network manager 60 facilitates (e.g., initiates, issues an instruction, performs, etc.) network resource management to support the communication of packets via the vehicular communication network 20 in accordance with the global vehicle network communication protocol. For instance, the network manager 60 performs access prioritization management, bandwidth allocation management, packet redundancy management, link redundancy management, data transmission latency management, link diagnostics, network security, virtual local area network setup, legacy packet/frame management, adding and/or deleting devices from access to the network, etc.

The power manager 70 functions in concert with the network manager 60 to optimize power consumption of the vehicular communication network 20 and/or the devices coupled thereto. For instance, the power manager 70 may manage the devices individually, may manage and island of devices, and/or may manage power to network interfaces. Such power management includes a sleep-wake mode, an on-off power mode, in-use power consumption reduction techniques (e.g., reduce power supply voltage, reduced clock rate, current limit, etc.), and/or utilizing low power communication links at the physical layer.

The memory 80 may be a variety of memory devices such as nonvolatile memory, volatile memory, disk drive, memory, solid-state memory, and/or any other type of memory. The memory 80 may be used for storing multi-media files (e.g., video files, audio files, etc.), electronic control unit applications, multimedia applications, diagnostic data, performance data, and/or any other data associated with the use and/or performance of the vehicle.

In an example of operation, a network node module 30 (e.g., a sensor) generates a packet in accordance with the global vehicle network communication protocol (e.g., formats the packet in accordance with the information regarding formatting of the packets). The network node module 30 then transmits the packet via the vehicular communication network 20 in accordance with the global vehicle network communication protocol. For instance, the vehicular communication network 20 routes the packet based on content type of the packet (and the destination address) to another network node module 30 and/or to the gateway 40 or communication links 50.

In an exemplary embodiment, the vehicular communication network 20 has an Ethernet bus structure (or other packet/frame structure) that enables packet/frame-based communication among the plurality of electronic devices within a vehicle. In addition, the vehicular communication network 20 is a semi-static network thereby allowing pre-configured spanning trees to be utilized for fast reconfiguration of the network; has configured dedicated bandwidth allocation for at least some of the devices to ensure a particular level of data throughput for mission critical and some non-mission critical applications; supports virtualized local area networks; supports a centralized and/or distributed bus monitoring system; utilizes a new class of packets for car control; supports security and authentication of device replacement and or new device installment; supports lossless Ethernet transmissions through redundant paths; supports a low latency protocol for mission-critical packets; and/or supports fast link fail-over.

Figure 3:
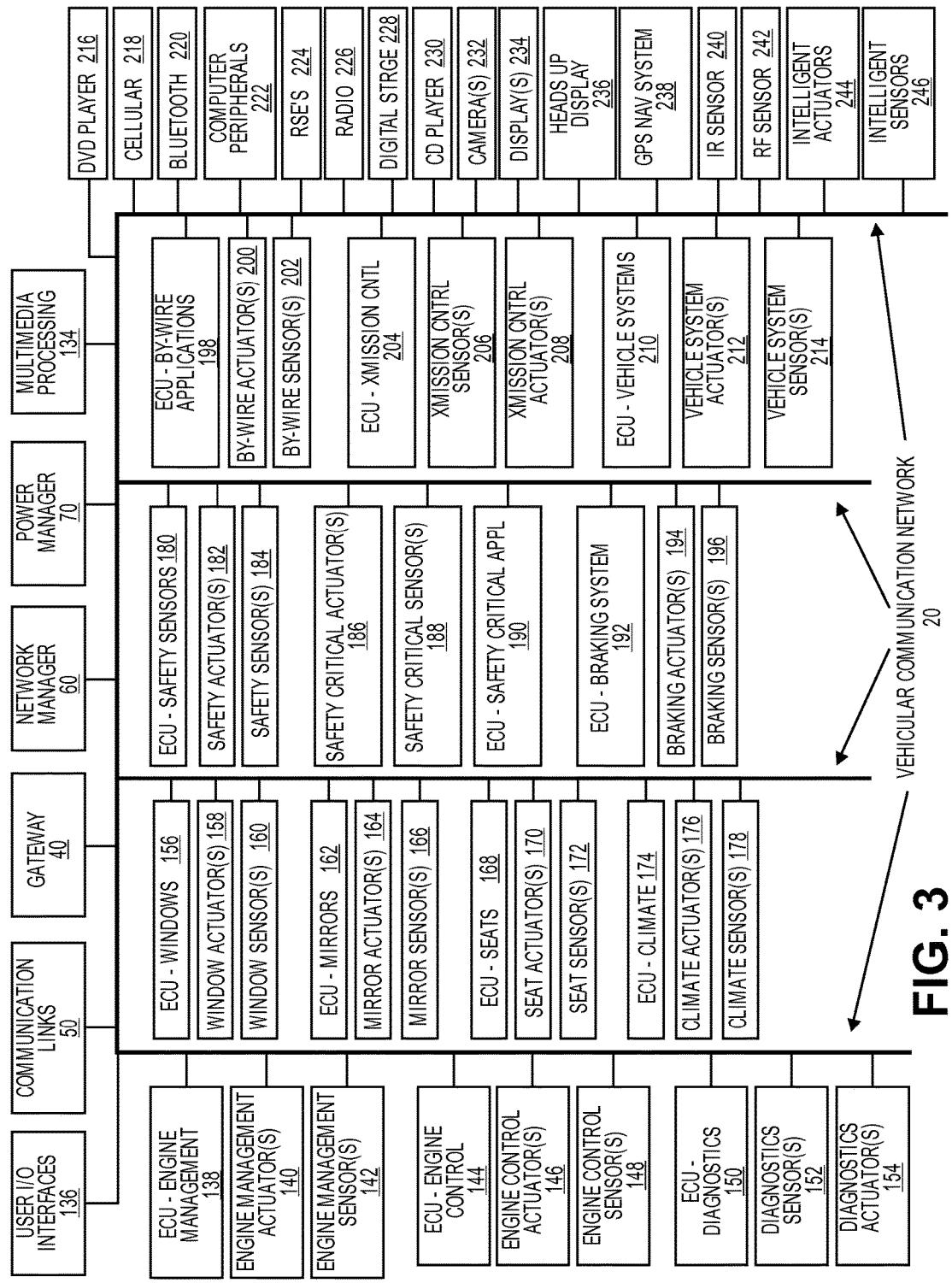
FIG. 3 is a schematic block diagram of an exemplary embodiment of an automotive neural network in accordance with the present invention.

FIG. 3 is a schematic block diagram of an exemplary embodiment of an automotive neural network that includes the vehicular communication network 20, one or more communication links 50, the gateway 40, the network manager 60, the power manager 70, one of more multimedia processing modules 134, a plurality of user input and/or output interfaces 136 (e.g., seat adjust, windowed control, radio control, mirror control, GPS control, cruise control, etc.), and a plurality of network node modules. Each of the network node modules includes a network interface for coupling to the vehicular communication network 20 and at least one device.

The devices may include one or more of each of an engine management electronic control unit 138, an engine management actuator 140, an engine management sensor 142, an engine control electronic control unit 144, an engine control actuator 146, an engine control sensor 148, a diagnostic electronic control unit 150, a diagnostic sensor 152, a diagnostic actuator 154, a window electronic control unit 156, a window actuator 158, a window sensor 160, a mirror electronic control unit 162, a mirror actuator 164, a mirror sensor 166, a seat electronic control unit 168, a seat actuator 170, a seat sensor 172, a climate electronic control unit 174, a climate actuator 176, a climate sensor 178, a safety sensor electronic control unit 180, a safety actuator 182, a safety sensor 184, a safety critical application electronic control unit 186, a safety critical actuator 188, a safety critical sensor 190, a braking system electronic control unit 192, a breaking actuator 194, a breaking sensor 196, a by-wire application electronic control unit 198, a by-wire actuator 200, a by-wire sensor 202, a transmission control electronic control unit 204, a transmission sensor 206, a transmission actuator 208, a vehicle system electronic control unit 210, a vehicle system actuator 212, a vehicle system Sensor 214, a DVD player 216, a cellular telephone interface 218, a Bluetooth interface 220, a computer peripheral interface 222, a rear seat entertainment interface and/or unit 224, a radio 226, digital storage 228, a CD player 230, a camera 232, a display 234, a heads-up display 236, a GPS navigation system 238, an infrared sensor 240, a radio frequency sensor 242, an intelligent actuator 244, and/or an intelligent sensor 246.

The multimedia processing module 134 provides audio, video, text, and/or graphics processing for the vehicle. For instance, the multimedia processing module 134 may support a GPS navigation system, provides rendered video and/or graphic images to displays, processes digital images received by cameras, and/or provides images to other audio/video equipment within the vehicle. The multimedia processing module 134 may be a single processing device or a plurality of processing devices. Such a processing device may be a microprocessor, micro-controller, digital signal processor, microcomputer, central processing unit, field programmable gate array, programmable logic device, state machine, and/or any device that manipulates signals (analog and/or digital) based on hard coding of the circuitry and/or operational instructions. The multimedia processing module 134 may further have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the multimedia processing module 134 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the multimedia processing module 134 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the multimedia processing module 134 executes, hard coded and/or operational instructions corresponding to at least some of the steps and/or functions illustrated in one or more of the Figures.

Since each network node module may include one or more of these vehicle devices, each network node module typically includes a local processing module that can communicate with the vehicle device(s) and with the network manager 60. For example, the local processing module may send status and relay commands to the network manager 60. Such decentralized local processing may affect the reliability of the vehicle. For example, the local processing modules create additional single points of failure in the network, which can lead to a higher overall maintenance requirement. In addition, if the processing module manages multiple vehicle devices, failure of the processing module failure will result in failure of each vehicle device managed by that processing module. Furthermore, as the complexity increases with the demand on smarter vehicles, any additional nesting of local processing modules may make debugging and fault isolation even more difficult. Although redundancy at the component level may improve the reliability, such redundancy is costly and requires more space and wiring.

The technical descriptions described herein, in various embodiments, account for and provide reconfigurable network node modules implementing an automotive neural network. More specifically, the reconfigurable network node modules utilize a switch to re-route traffic from vehicle devices managed by a failed local processing module to another processing module within the vehicular communication network. This allows the continued function of the affected vehicle devices until the failed local processing module can be repaired. In addition, debugging and fault isolation can be implemented quickly and easily with such an automotive neural network.

Figure 4:
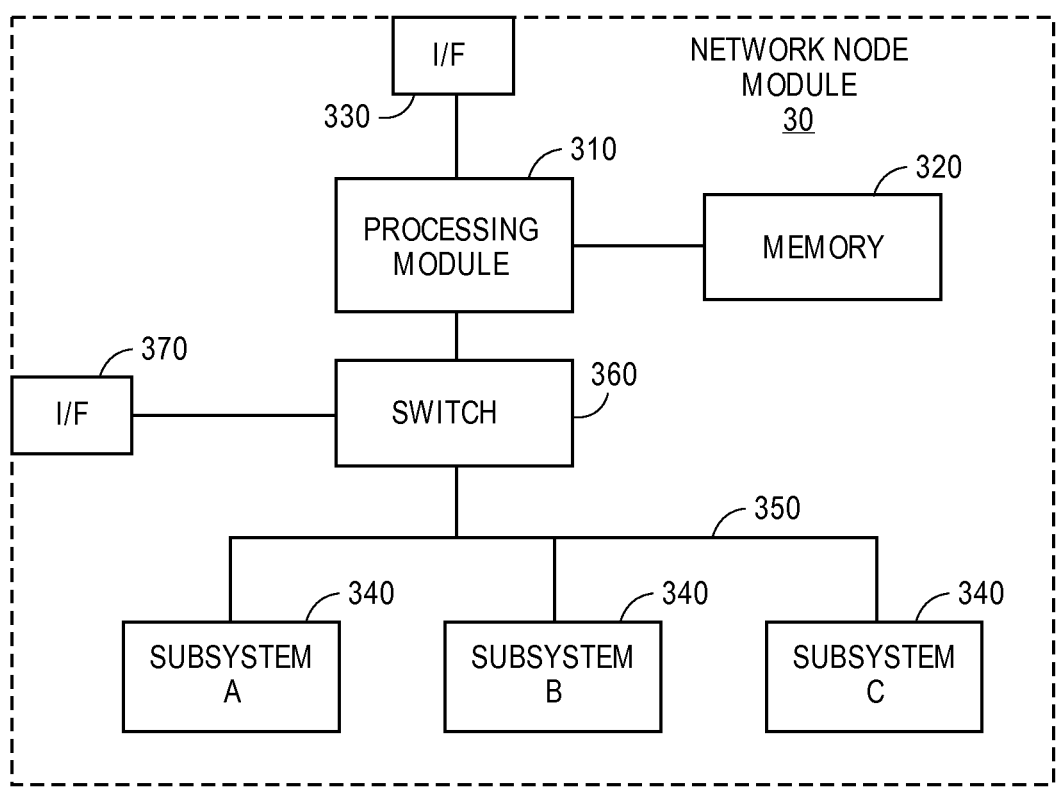
FIG. 4 is a schematic block diagram of an embodiment of a reconfigurable network node module within an automotive neural network in accordance with the present invention.

FIG. 4 is a schematic block diagram of an embodiment of a reconfigurable network node module 30 that includes a processing module 310, a memory 312, a first network interface 330, one or more subsystems 340, a switch 360 and a second network interface 370. The one or more subsystems 340 (Subsystem A, Subsystem B and Subsystem C) correspond to one or more vehicle devices, as shown in FIG. 3. For example, a subsystem 340 may be a sensor, and actuator, electronic control unit, a user input device, a user output device, a communication device, an info-tainment (multimedia) device, etc.

The processing module 310 implements a local network node management function (which may include, for example, a locally managed prioritization scheme). The memory 320 includes data utilized by the processing module 310 for performing various operations, such as data input/output, packet processing and vehicle operations.

The processing module 310 is coupled to the vehicular communication network via the first network interface 330. The processing module 310 is further coupled to the one or more subsystems 340 via the switch 360 and an Ethernet bus 350. In an exemplary embodiment, the Ethernet bus 350 includes a plurality of Ethernet links (e.g., twisted pair, coaxial cable, category 5 cables, fiber optics, etc.) coupling the one or more subsystems 340 to the processing module 310. For example, the Ethernet bus 350 may daisy chain the one or more subsystems 340 with the switch 360 or may couple the one or more subsystems 340 to the switch 360 via a hub or switch. The switch 360 further couples the one or more subsystems 340 to an external processing module within the vehicular communication network (not shown) via the second network interface 370.

In an example of operation, one of the subsystems 340, such as Subsystem A, generates an outgoing device packet (or frame). In this instance, Subsystem A provides the packet via Ethernet bus 350 to processing module 310. Although not shown, a buffer may receive the Ethernet packet and temporarily store the Ethernet packet for the processing module 310. The processing module 310 may further manage the inputting and outputting of packets in the buffer (e.g., a queue) based on a prioritization scheme. For example, the processing module 310 may interpret the packets to determine the source, destination and types of packets and then determine the locally managed prioritization scheme based on the source, destination and/or types of packets (e.g., mission critical packets, network protocol packets, vehicle operation packets, and/or information-entertainment packets).

The processing module 310 may further translate between a global vehicle network communication protocol utilized by the vehicular communication network and a particular vehicle device communication protocol (e.g., CAN, Flex Ray, etc.) utilized by Subsystem A. For example, the processing module 310 may convert an Ethernet packet of the vehicle device communication protocol into an Ethernet packet of the global network communication protocol. Alternatively, the processing module 310 may encapsulate the vehicle device communication packet of Subsystem A into a global vehicle network communication protocol packet.

In addition, the processing module 310 may further determine a level of protection, priority, security, and/or privacy of the packet. The processing module 310 may further determine if any other specific processing is to be performed locally on the packet based on various aspects of the packet, and if so, the processing module 310 performs the requisite processing. Determining the processing for the packet may include, in some embodiments, determining packet routing parameters based on the packet content type. Once the packet has been processed, the processing module 310 may evoke a routing function to forward or route the packet to its destination (which may internal within the network node module 30 or external within the vehicular communication network) in accordance with its priority level and/or security level.

When the processing module 310 is functioning, the switch 360 couples the one or more subsystems 340 to the processing module 310. However, in accordance with embodiments of the present invention, when the processing module 310 fails, the switch 360 re-routes traffic from the one or more subsystems 340 to the external processing module via network interface 370. For example, in embodiments in which the one or more subsystems 340 includes a multimedia device, the switch 360 can operate to switch packets generated by the multimedia device onto an audio-video bridging stream to the external processing module. The external processing module may be a local processing module within another network node module (nearby or remote), a central processing module within the vehicular communication network (e.g., network manager of FIGS. 2-3), a dedicated processing module (e.g., redundant or back-up processing module for multiple network node modules) or another external processing module.

A management system within the vehicular communication network reconfigures the subsystems 340 and/or switch 360 to re-route packets to the external processing module. In one embodiment, a central management system (e.g., a central processing module) reconfigures the subsystems 340 when the local processing module 310 fails. For example, the central processing module may transmit periodic control signals to the local processing module 310, and upon determining that the local processing module 310 has failed (e.g., receiving no response from the processing module or determining that the processing module is unable to perform its assigned tasks), provide the subsystems 340 within the network node module 30 with the MAC address of an external processing module (via interface 370 and switch 360) so that packets are re-routed from the subsystems 340 to the external processing module via the switch 360 and the interface 370.

In another embodiment, a distributed management system is utilized. For example, the management system may be distributed among subsets of the network node modules 30 or among the external processing modules themselves. In the latter example, the external processing module may transmit periodic control signals to the local processing module 310, and upon determining that the local processing module 310 has failed, provide the subsystems 340 with its MAC address, so that packets are re-routed via switch 360 and interface 370. In still another embodiment, the local processing module 310 and the external processing module may be placed on a VLAN and the management system can reconfigure the switch 360 so that packets are re-routed to the external processing module when the local processing module 310 fails. Many variations for reconfiguration of the network node module 30 are possible, and the present invention is not limited to any particular type of reconfiguration.

In one embodiment, the switch 360 is a three-port switch with a first port coupled to the processing module 310, a second port coupled to the Ethernet bus 350 and a third port coupled to the second network interface 370. In another embodiment, the switch 360 includes multiple switches for coupling to two or more external processing modules.

The processing module 310 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 310 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module 310 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 310 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 310 executes, hard coded and/or operational instructions corresponding to at least some of the steps and/or functions illustrated in one or more of the Figures.

Figure 5:
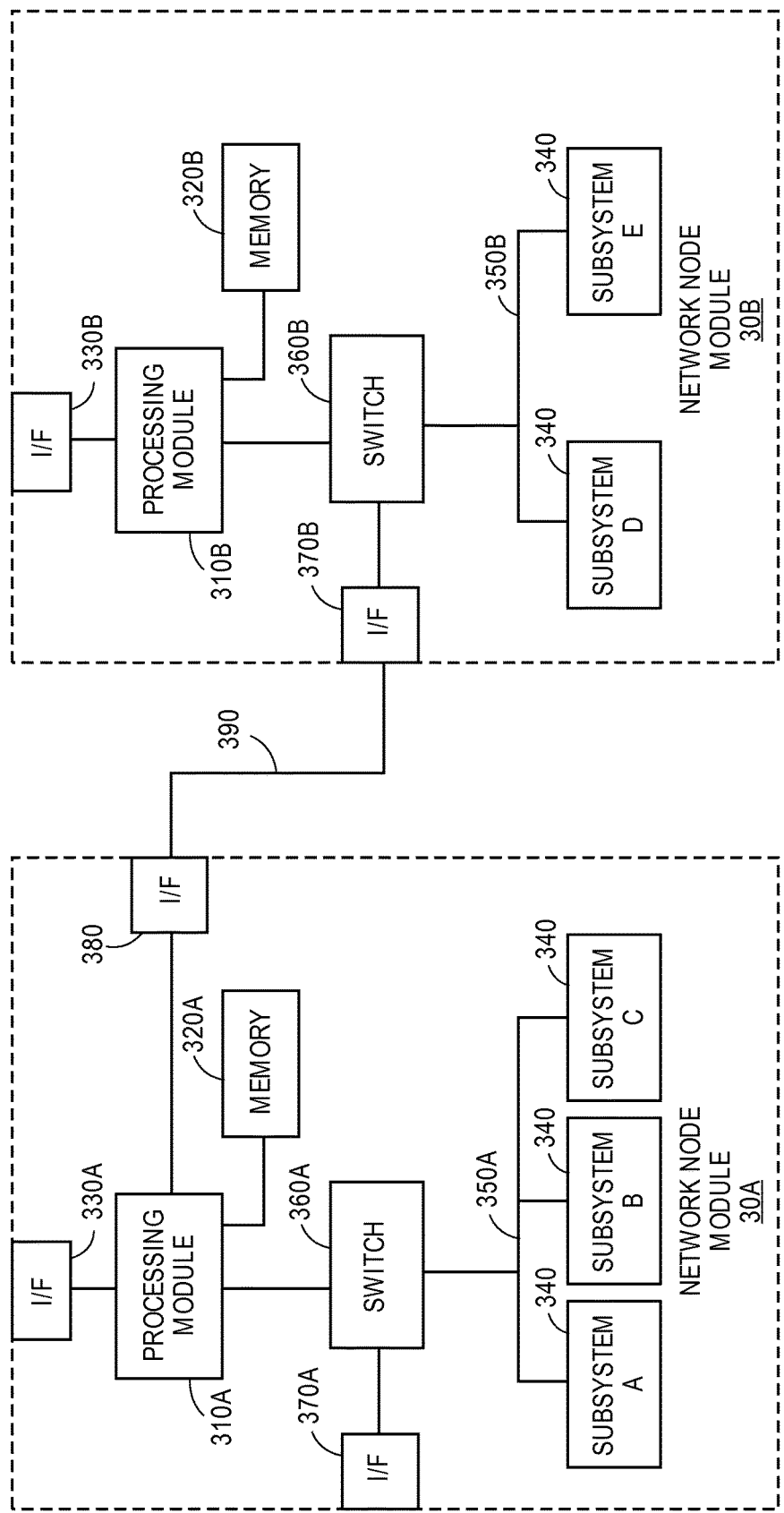
FIG. 5 is a schematic block diagram of an embodiment of reconfigurable network node modules within an automotive neural network in accordance with the present invention.

FIG. 5 is a schematic block diagram of an embodiment of reconfigurable network node modules within an automotive neural network in accordance with the present invention. As shown in FIG. 5, two network node modules 30A and 30B are reconfigurable to provide failover protection for the respective local processing modules 310A and 310B within the network node modules 30A and 30B. Each network node module 30A and 30B includes respective first network interfaces 330A and 330B, second network interfaces 370A and 370B, processing modules 310A and 310B, memories 320A and 320B, switches 360A and 360B, Ethernet busses 350A and 350B and subsystems 340. For example, network node module 30A includes Subsystem A, Subsystem B and Subsystem C, while network node module 30B includes Subsystem D and Subsystem E.

Network node module 30A further includes a third network interface 380 that is coupled to the second network interface 370B of network node module 30B via an Ethernet link 390. In one embodiment, network node module 30A is directly coupled to network node module 30B within the vehicular communication network (e.g., without any intervening devices, routers, components or modules). In another embodiment, network node module 30A is indirectly coupled to network node module 30B within the vehicular communication network.

When the processing module 310B within network node module 30B is functioning, switch 360B couples Subsystem D and Subsystem E to the processing module 310B. However, when the processing module 310B fails, switch 360B re-routes traffic from Subsystem D and Subsystem E to processing module 310A within network node module 30A via network interface 370B and network interface 380.

Thus, when processing module 310B fails, processing module 310A manages traffic from Subsystems A-E. In one embodiment, processing module 310A can prioritize traffic received from the different subsystems 340 and/or block traffic from one or more of the subsystems 340 to ensure processing requirements for critical applications are met. For example, if there is a limitation due to latency, bandwidth available to the link 390 and/or processing capability of processing module 310A, the processing module 310A can instruct Subsystem D and/or Subsystem E to refrain from sending packets or to only send high priority packets until the limitations are resolved. Rather than reduce the functionality set of the impacted network node module 310B, the processing module 310A may instead instruct Subsystem A, B and/or C to refrain from sending packets or to only send high priority packets. In another embodiment, security techniques, such as dedicated private VPNs and/or encryption may be utilized by the processing module 310A in communicating with Subsystems D and E to allow for the control traffic to traverse other modules, such as an info-tainment switch.

In an example of operation, upon receiving a packet from one of the subsystems 340 (e.g., Subsystem D) within network node module 30B at processing module 310A within network node module 30A, the processing module 310A interprets the packet. Such an interpretation includes determining the type of packet (e.g., mission critical (e.g. from a brake/ABS sensor), network data, info-tainment, vehicle operation, etc.) and may further include determining a destination for the packet. Determining the type of packet can include determining the type of content carried by the packet (i.e. the packet content type) any may further include determining a level of protection, security, and/or privacy of the packet.

Having identified the packet, the processing module 310A determines the processing for the packet based on the various aspects of the packet and then processes the packet accordingly. Determining the processing for the packet includes, in some embodiments, determining a priority of the packet from the content of the packet and/or from the source of the packet. For example, the processing module 310A may be configured to prioritize packets received from Subsystem A, Subsystem B or Subsystem C over packets received from Subsystem D or Subsystem E. As another example, the processing module 310A may be configured to prioritize packets received from Subsystem D over packets received from Subsystem B or Subsystem C, but not from Subsystem A or Subsystem E. There are many possible variations of prioritizing packets for processing by the processing module 310A and the present invention is not limited to any particular prioritization scheme.

As a specific example, when the processing module 310A determines that the packet is related to a mission critical operation (based on the content or source of the packet), it assigns a high level of priority to the packet and processes the packet ahead of other non-mission critical packets. Such processing may involve, for example, accessing the memory 320A to determine if any specific processing is to be performed. If no specific processing is to be performed, the processing module 310A may evoke a routing function to forward or route the packet to the destination in accordance with its priority level and/or security level. If the processing module 310A determines that the packet does have specific performance requirements (e.g., store the data in memory 320A, forward to a gateway for transmission to an external device, convert between communication protocols, etc.), the processing module 310A processes the packet accordingly. For example, most communications within the vehicular communication network may use a default communication protocol (e.g., 100 Mbps or 1 Gbps Ethernet), however, some communications within the vehicular communication network may deviate from the default communication protocol. For instance, between two modules within the vehicular communication network, 10 Gb Ethernet may be used or non-standard speeds such as 200 Mbps, or 2.5 Gbps Ethernet may be used between particular modules.

After the processing module 310A has processed the packet, the processing module 310A may evoke a routing function to forward or route the processed packet to its destination in accordance with its priority level and/or security level. Since the packet is generated by a subsystem external to network node module 30A, the processing module 310A may further access network topology information in the memory 320A to forward or route the processed packet. Such network topology information may include, for example, a listing of preconfigured spanning tree network topologies for packets received from network node module 30B or include information for reconfiguration of the network due to failure of processing module 310B.

Figure 6:
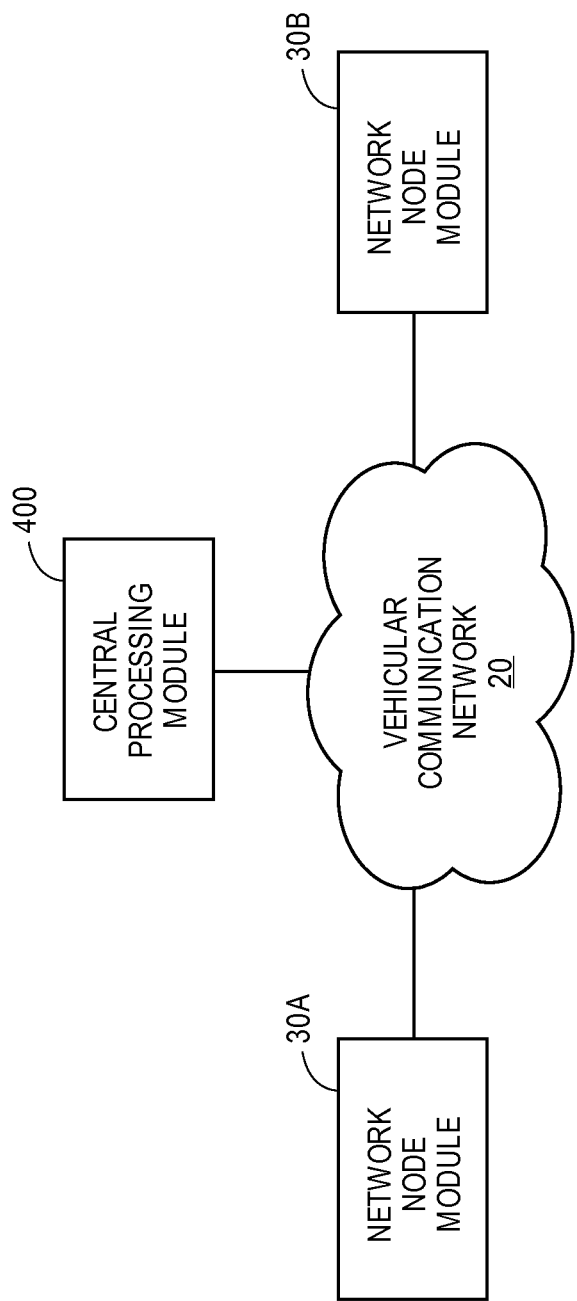
FIG. 6 is a schematic block diagram of another embodiment of reconfigurable network node modules within an automotive neural network in accordance with the present invention.

FIG. 6 is a schematic block diagram of another embodiment of reconfigurable network node modules within an automotive neural network in accordance with the present invention. In FIG. 6, two network node modules 30A and 30B are shown coupled via the vehicular communication network 20. In addition, a central processing module 400 (e.g., network manager of FIGS. 2 and 3) is further coupled to the vehicular communication network 20. In this embodiment, the central processing module 400 controls re-routing of traffic between network node modules 30A and 30B upon failure of local processing modules within the network node modules 30A and 30B. In one embodiment, a central processing module 400 controls each of the network node modules 30A and 30B within the vehicular communication network 20. In another embodiment, multiple distributed processing modules 400 may be employed, each controlling a subset of the network node modules 30A and 30B within the vehicular communication network 20.

In an example of operation, the central processing module 400 may transmit periodic control signals to the processing modules of each of the network node modules 30A and 30B, and upon determining that the processing module of one of the network node modules (e.g., network node module 30A) has failed (e.g., by receiving no response from the processing module), the central processing module 400 can identify another network node module 30B to manage traffic from the failed network node module 30A and reconfigure the failed network node module 30A to re-route traffic from one or more subsystems within the failed network node module 30A to network node module 30B. Network node module 30B can be selected, for example, based on the type of operations performed by the one or more subsystems within the failed network node module 30A and/or based on the location of the failed network node module 30A within the vehicular communication network. Traffic can be routed from the failed network node module 30A directly to the new network module 30B (e.g., without going through the central processing module 400) or through the central processing module 400. In the latter case, the central processing module 400 may have another switch coupled thereto to switch traffic received from failed network node modules 30A to other network node modules 30B.

FIG. 7 is a schematic block diagram of another exemplary embodiment of a vehicular communication network 20 of an automotive neural network in accordance with the present invention. The vehicular communication network 20 includes a plurality of network node modules 30, a plurality of bridge-routing modules 420, a plurality of switch modules 410 and a central processing module 400. Each of the switch modules 410 is coupled to one or more network node modules 30 and to at least one bridge-routing module 420. Each of the bridge-routing modules 420 is further coupled to at least one other bridge-routing module 420. The coupling between bridge-routing modules 420, between bridge-routing modules 420 and the central processing module 400, between bridge-routing modules 420 and switch modules 410 and between switch modules 410 and network node modules 30 includes Ethernet links 390 (e.g., unshielded twisted pair, shielded twisted pair, coaxial cable, category 5 or 6 cables, fiber optics, etc.).

Note that more or less switching modules 410 and bridge-routing modules 420 may be included in the vehicular communication network 20. Further note that the respective connections between switch modules 410 and bridge-routing modules 420 may each include two or more Ethernet links, where one of the links is active and the other is used for fail over or redundancy. Still further note that a network node module 30 may be directly connected to a bridge-routing module 420.

As discussed above, the central processing module 400 operates to determine whether a local processing module within one of the network node modules 30 has failed, and if so, to identify another network node module 30 to manage traffic from the failed network node module 30. The central processing module 400 further operates to reconfigure the failed network node module 30 and the vehicular communication network 20 to re-route traffic from one or more subsystems within the failed network node module 30 to the new network node module 30. As further discussed above, the new network node module 30 can be selected, for example, based on the type of operations performed by the one or more subsystems within the failed network node module 30 and/or based on the location of the failed network node module 30 within the vehicular communication network.

As a specific example, the central processing module 400 can select another network node module 30 coupled to the same switch module 410 as the failed network node module 30 to manage traffic from the failed network node module 30 to minimize reconfiguration of the vehicular communication network 20. As another specific example, if the failed network node module 30 includes info-tainment devices, the central processing module 400 can select a new network node module regardless of the location of the new network node module within the vehicular communication network 20 to ensure the local processing module within the new network node module is able to process info-tainment packets.

Figure 8:
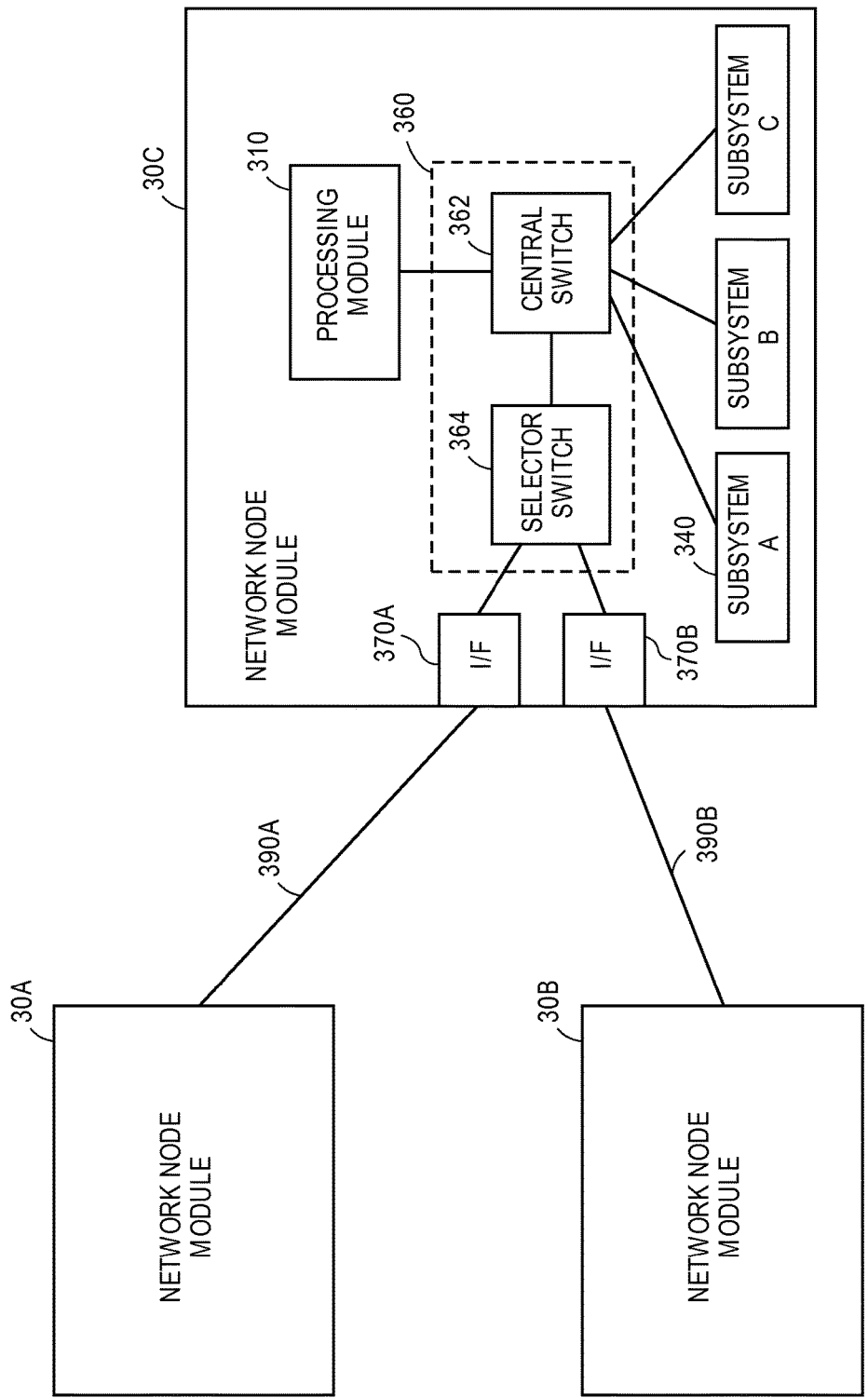
FIG. 8 is a schematic block diagram of another embodiment of reconfigurable network node modules within an automotive neural network in accordance with the present invention.

FIG. 8 is a schematic block diagram of another embodiment of reconfigurable network node modules within an automotive neural network in accordance with the present invention. In FIG. 8, there are three network node modules 30A, 30B and 30C. Network node module 30C is shown including a processing module 310, switch 360, a plurality of subsystems 340 (Subsystem A, Subsystem B and Subsystem C) and network interfaces 370A and 370B. It should be noted that other network interfaces and components may also be included within network node module 30C, as indicated in previous Figures.

Network interface 370A is coupled to network node module 30A via Ethernet link 390A, while network interface 370B is coupled to network node module 30B via Ethernet link 390B. Ethernet links 390A and 390B may provide a respective direct coupling between network node modules 30A and 30C and between network node modules 30B and 30C or an indirect coupling therebetween (e.g., via one or more switch modules and/or bridge-routing modules, as shown in FIG. 7, and/or via one or more additional network node modules).

Switch 360 includes a central switch 362 and a selector switch 364. The central switch 362 is coupled to the processing module 310, to the subsystems 340 and to the selector switch 364. The selector switch 364 is coupled to the central switch 362, network interface 370A and network interface 370B. The central switch 362 operates to route traffic between the subsystems 340 and the processing module 310 when the processing module 310 is functioning, and to re-route traffic from the subsystems 340 to the selector switch 364 when the processing module 310 fails. The selector switch 364 operates to route traffic from the central switch 362 (i.e., packets from one of the subsystems 340) to one of the network interfaces 370A or 370B.

Thus, selector switch 364 operates to select one of the other network node modules 30A or 30B (e.g., based on the destination MAC addresses of packets originated by the subsystems 340) to manage traffic from the subsystems 340 when the local processing module 310 within network node module 30C fails. The network node module 30A or 30B can be selected, for example, based on the location of the network node modules 30A-30C within the vehicular communication network, the type of operations performed by the subsystem 340, the state of Ethernet links 390A and 390B (congested, failed, insufficient bandwidth available), latency requirements of the traffic originated by the subsystems 340, processing capabilities and/or capacity of each network node module 30A and 30B, and other factors. The selector switch 364 may further be configured to select one network node module 30A for traffic originated by one or more of the subsystems 340 (e.g., Subsystem A) and to select the other network node module 30B for traffic originated by the other subsystems 340 (e.g., Subsystem B and Subsystem C).

Figure 9:
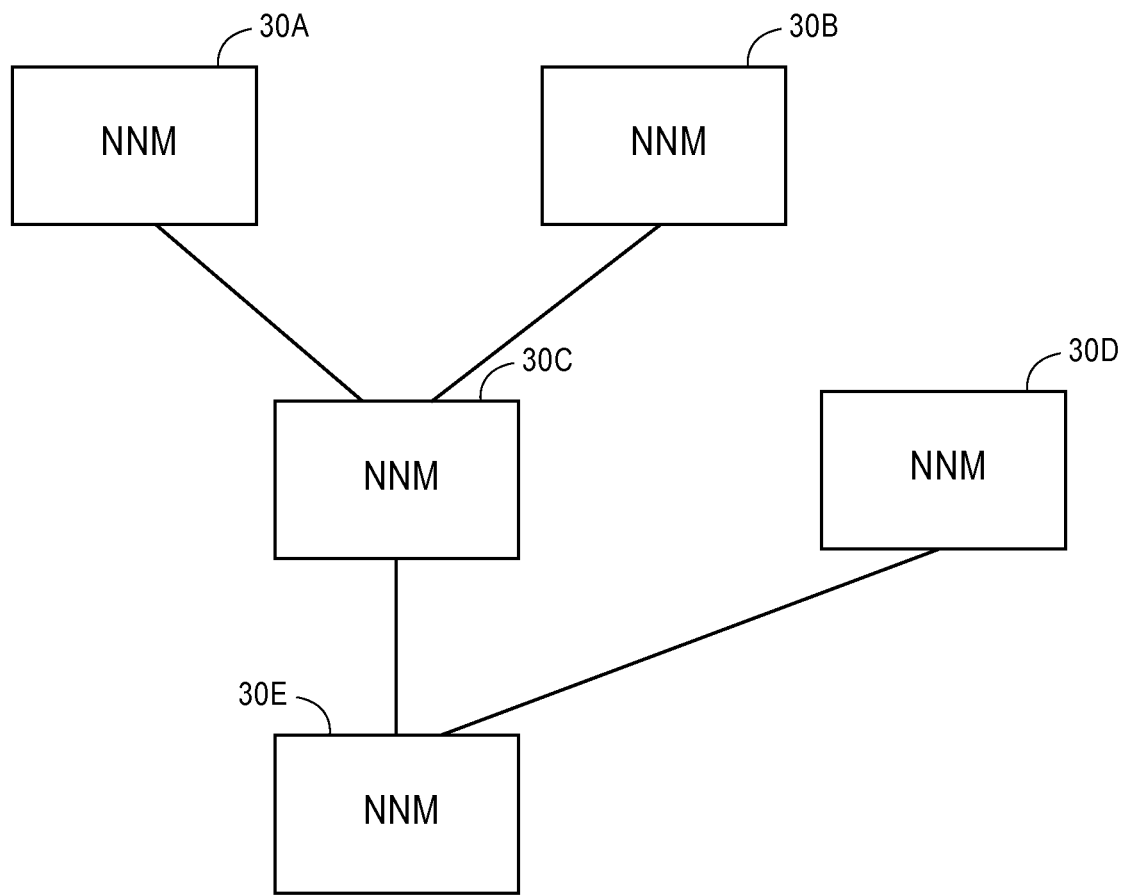
FIG. 9 is a schematic block diagram of another embodiment of reconfigurable network node modules within an automotive neural network in accordance with the present invention.

FIG. 9 is a schematic block diagram of another embodiment of reconfigurable network node modules within an automotive neural network in accordance with the present invention. In FIG. 9, the network node modules (NNMs) 30A-30E are coupled together in a hierarchical configuration such that NNM 30C is coupled to NNM 30A and NNM 30B, while NNM's 30C and 30D are coupled to NNM 30E. Thus, the local processing module within NNM 30C serves as a back-up processing module for both NNM 30A and 30B, while the local processing module within NNM 30E serves as a back-up processing module for both NNM 30C and 30D. Multiple hierarchical configurations can be utilized within a vehicular communication network to minimize wiring and/or to provide for efficient usage of local processing resources. In addition, configurations such as those shown in FIG. 8 can also be expanded to form a hierarchical configuration and/or can be used together with a hierarchical configuration of the type shown in FIG. 9.

Figure 10:
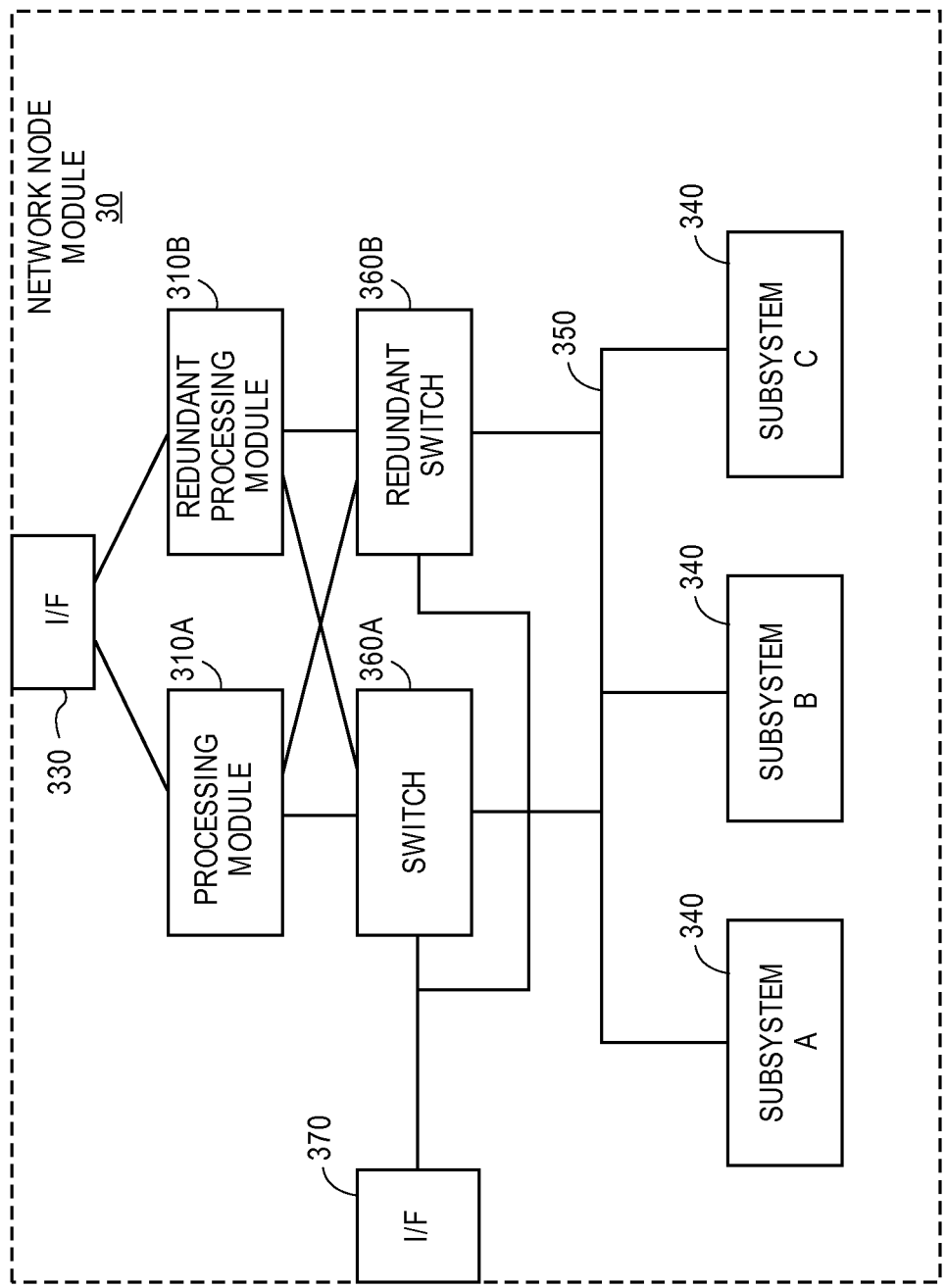
FIG. 10 is a schematic block diagram of another reconfigurable network node module of an automotive neural network in accordance with the present invention.

FIG. 10 is a schematic block diagram of another reconfigurable network node module of an automotive neural network in accordance with the present invention. In FIG. 10, the network node module 30 includes a first network interface 330, a second network interface 370, processing module 310A, redundant processing module 310B, switch 360A, redundant switch 360B, Ethernet bus 350 and subsystems 340 (Subsystem A, Subsystem B and Subsystem C). The processing module 310A and redundant processing module 310B are each coupled to the first network interface 330 and to both switch 360A and redundant switch 360B. Switch 360A and redundant switch 360B are each further coupled to the second network interface 370 and to the Ethernet bus 350. It should be understood that the first network interface 330 and second network interface 370 may each include multiple ports. For example, the first network interface 330 may include a separate port for each processing module 310A and 310B and the second network interface 370 may include a separate port for each switch 360A and 360B. As another example, the first network interface 330 may include two ports, each coupled to both processing modules 310A and 310B and the second network interface 370 may include two ports, each coupled to both switches 360A and 360B. It should further be understood that in embodiments where a single processing module and/or a single switch is utilized, multiple ports may also be utilized.

The redundant processing module 310B and redundant switch 360B provide further reliability by eliminating the single point of failure of the switch 360A and reducing network traffic in the case of failure of the primary processing module 310A. Such redundancy may be beneficial, for example, in mission-critical network node modules 30 and/or processing-intensive network node modules 30. It should be noted that when redundancy is utilized within one or more of the network node modules 30 of a vehicle, the network node modules 30 may include only one of the redundant processor 310B and the redundant switch 360B, depending on the requirements of the vehicle.

Figure 11:
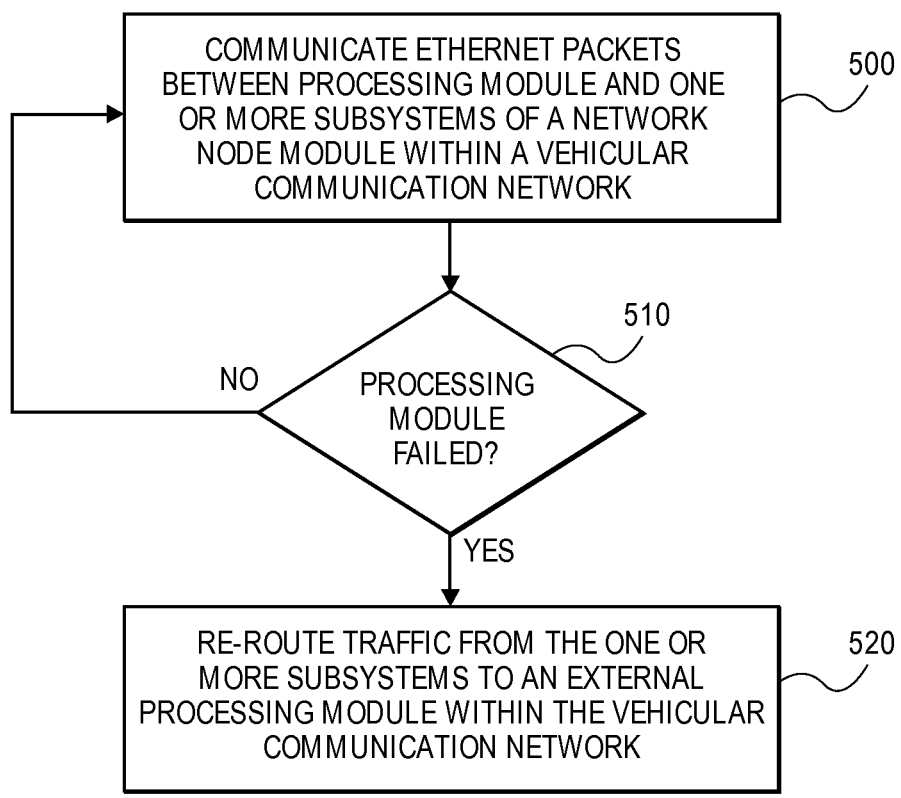
FIG. 11 is a logical diagram of a network reconfiguring process for an automotive neural network in accordance with the present invention.

FIG. 11 is a logical diagram of a network reconfiguring process for an automotive neural network in accordance with the present invention. The process begins at 500 with a local processing module within a network node module of a vehicular communication network communicating Ethernet packets with one or more subsystems within the network node module. At 510, a determination is made whether the local processing module has failed. If so, at 520, traffic is re-routed from the one or more subsystems within the failed network node module to an external processing module within the vehicular communication network.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", It's and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The invention claimed is:

1. A vehicular communication device, comprising:
  a vehicular network interface configured to support communications with other vehicular components in a vehicle via a vehicular communication network; and
  processing circuitry configured to communicate with local processing circuitry of a plurality of network node modules in the vehicle via the vehicular network interface and the vehicular communication network;
  wherein the processing circuitry is further configured to:
    determine that local processing circuitry of a first one of the plurality of network node modules has failed; and
    when the local processing circuitry of the first one of the plurality of network node modules has failed, support rerouting of traffic intended for the local processing circuitry of the first one of the network node modules to processing circuitry external to the first one of the network node modules.

2. The vehicular communication device of claim 1, wherein the processing circuitry external to the first one of the plurality of network node modules comprises processing circuitry of a second one of the plurality of network node modules.

3. The vehicular communication device of claim 1, wherein the vehicular network interface comprises a multi-port Ethernet switch.

4. The vehicular communication device of claim 1, wherein the vehicular network interface comprises an Ethernet Physical Interface.

5. The vehicular communication device of claim 1, wherein the processing circuitry external to the first one of the plurality of network node modules is selected based upon latency requirements of the first one of the plurality of network node modules.

6. The vehicular communication device of claim 1, wherein the processing circuitry external to the first one of the plurality of network node modules comprises processing circuitry external to the vehicle.

7. The vehicular communication device of claim 6, wherein the vehicular network interface supports wireless inter-vehicular communications.

8. The vehicular communication device of claim 6, wherein rerouting of the traffic intended for the local processing circuitry of the first one of the network node modules to processing circuitry external to the first one of the network node modules comprises rerouting of the traffic from the vehicular network interface to a wireless network interface that supports wireless inter-vehicular communications.

9. The vehicular communication device of claim 1, wherein the processing circuitry and vehicular network interface are further configured to translate communications between an Ethernet format and a differing vehicle communication format.

10. The vehicular communication device of claim 9, wherein the differing vehicle communication format comprises one of:
  J1850 format;
  OBDII format;
  Intellibus format;
  Controller Area Network (CAN) format;
  FlexRay format;
  Bosch-Siemens-Temic format;
  Motorola® interconnect (MI) format;
  Mobile Media Link (MML) format;
  Domestic Digital Data (D2B) format;
  smartwireX format;
  inter-equipment bus (IEBus) format; or
  media oriented systems transport (MOST) format.

11. The vehicular communication device of claim 1, wherein the processing circuitry is further configured to select the processing circuitry external to the first one of the network node modules based on one or more operations performed by the first one of the network node modules.

12. The vehicular communication device of claim 1, wherein the processing circuitry is further configured to select the processing circuitry external to the first one of the network node modules based on respective locations of the first one of the network node modules and the processing circuitry external to the first one of the network node modules.

13. The vehicular communication device of claim 1, wherein the processing circuitry, the local processing circuitry of the first one of the plurality of network node modules, and the processing circuitry external to the first one of the network node modules are coupled together in one or more hierarchical configurations and the processing circuitry is configured to select the processing circuitry external to the first one of the network node modules based on the one or more hierarchical configurations.

14. The vehicular communication device of claim 1, wherein the plurality of network node modules are indirectly coupled to one another via the vehicular network interface.

15. The vehicular communication device of claim 1, wherein the processing circuitry is further configured to control a powered state of at least one of the network node modules.

16. The vehicular communication device of claim 15, wherein the processing circuitry is further configured to control the powered state of the at least one of the network node modules by individually controlling powered states of a plurality of the network node modules.

17. The vehicular communication device of claim 15, wherein the processing circuitry is further configured to control the powered state of the at least one of the network node modules by controlling a powered state of a group of the plurality of the network node modules.

18. The vehicular communication device of claim 15, wherein the processing circuitry is further configured to control the powered state of the at least one of the network node modules by controlling a power to a network interface servicing the at least one of the network node modules.

19. A vehicular communication device, comprising:
a vehicular network interface configured to support communications with a plurality of network node modules in a vehicle via a vehicular communication network, each of the plurality of network node modules including at least one vehicle sub-system; and
processing circuitry configured to communicate with respective local processing circuitry of the plurality of network node modules in the vehicle via the vehicular network interface and the vehicular communication network;
wherein the processing circuitry is further configured to:
determine that local processing circuitry of a first one of the plurality of network node modules has failed; and
when the local processing circuitry of the first one of the plurality of network node modules has failed, support rerouting of traffic intended for the local processing circuitry of the first one of the network node modules to processing circuitry external to the first one of the network node modules.

20. The vehicular communication device of claim 19, wherein the processing circuitry external to the first one of the plurality of network node modules comprises processing circuitry of a second one of the plurality of network node modules.

21. The vehicular communication device of claim 19, wherein the vehicular network interface comprises a multi-port Ethernet switch.

22. The vehicular communication device of claim 19, wherein the vehicular network interface comprises an Ethernet Physical Interface.

23. The vehicular communication device of claim 19, wherein the processing circuitry, the local processing circuitry of the first one of the plurality of network node modules, and the processing circuitry external to the first one of the network node modules are coupled together in one or more hierarchical configurations and the processing circuitry is configured to select the processing circuitry external to the first one of the network node modules based on the one or more hierarchical configurations.

24. The vehicular communication device of claim 19, wherein the plurality of network node modules are indirectly coupled to one another via the vehicular network interface.

25. The vehicular communication device of claim 19, wherein the processing circuitry external to the first one of the plurality of network node modules is selected based upon latency requirements of the first one of the plurality of network node modules.

26. The vehicular communication device of claim 19, wherein the processing circuitry external to the first one of the plurality of network node modules comprises processing circuitry external to the vehicle.

27. The vehicular communication device of claim 26, wherein the vehicular network interface supports wireless inter-vehicular communications.

28. The vehicular communication device of claim 26, wherein rerouting of the traffic intended for the local processing circuitry of the first one of the network node modules to processing circuitry external to the first one of the network node modules comprises rerouting of the traffic from the vehicular network interface to a wireless network interface that supports wireless inter-vehicular communications.

29. The vehicular communication device of claim 19, wherein the processing circuitry and vehicular network interface are further configured to translate communications between an Ethernet format and a differing vehicle communication format.

30. The vehicular communication device of claim 29, wherein the differing vehicle communication format comprises one of:
J1850 format;
OBDII format;
Intellibus format;
Controller Area Network (CAN) format;
FlexRay format;
Bosch-Siemens-Temic format;
Motorola® interconnect (MI) format;
Mobile Media Link (MML) format;
Domestic Digital Data (D2B) format;
smartwireX format;
inter-equipment bus (IEBus) format; or
media oriented systems transport (MOST) format.

31. The vehicular communication device of claim 19, wherein the processing circuitry is further configured to select the processing circuitry external to the first one of the network node modules based on one or more operations performed by the first one of the network node modules.

32. The vehicular communication device of claim 19, wherein the processing circuitry is further configured to select the processing circuitry external to the first one of the network node modules based on respective locations of the first one of the network node modules and the processing circuitry external to the first one of the network node modules.

33. The vehicular communication device of claim 19, wherein the processing circuitry is further configured to control a powered state of at least one of the network node modules.

34. The vehicular communication device of claim 33, wherein the processing circuitry is further configured to control the powered state of the at least one of the network node modules by individually controlling powered states of a plurality of the network node modules.

35. The vehicular communication device of claim 33, wherein the processing circuitry is further configured to control the powered state of the at least one of the network node modules by controlling a powered state of a group of the plurality of the network node modules.

36. The vehicular communication device of claim 33, wherein the processing circuitry is further configured to control the powered state of the at least one of the network node modules by controlling a power to a network interface servicing the at least one of the network node modules.

* * * * *